United States Patent [19]

Stephan

[11] Patent Number: 5,993,508
[45] Date of Patent: *Nov. 30, 1999

[54] BRIQUETTE AS AN ADDITIVE FOR METALLURGIC PURPOSES COMPRISING SILICON-CONTAINING RESIDUES, AND PROCESS FOR ITS PRODUCTION

[75] Inventor: Lutz Stephan, Titz, Germany

[73] Assignee: Elkem ASA, Oslo, Norway

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,699

[22] Filed: Jan. 23, 1997

[30] Foreign Application Priority Data

Jan. 24, 1996 [DE] Germany .............. 196 02 486

[51] Int. Cl.⁶ ..................................... C21C 7/00
[52] U.S. Cl. .............................. 75/314; 75/313; 75/303; 75/228; 75/230; 75/507; 75/414; 148/513; 148/514
[58] Field of Search .................. 75/314, 313, 303, 75/228, 230, 507, 414; 148/513, 514

[56] References Cited

U.S. PATENT DOCUMENTS

| | | | |
|---|---|---|---|
| 2,082,359 | 6/1937 | Schmacher | 75/314 |
| 2,111,344 | 3/1938 | Weitzenkorn | 75/314 |
| 2,119,521 | 6/1938 | Brown | 75/44 |
| 2,497,745 | 2/1950 | Stohr | 75/44 |
| 4,075,027 | 2/1978 | Knill et al. | 106/99 |

FOREIGN PATENT DOCUMENTS

| | | | |
|---|---|---|---|
| 244133 | 11/1987 | European Pat. Off. | B22C 3/00 |
| 263723 | 4/1988 | European Pat. Off. | C04B 16/02 |
| 2809807 | 9/1979 | Germany . | |
| 2852380 | 6/1980 | Germany . | |
| 3033194 | 4/1982 | Germany . | |
| 4140019 | 6/1993 | Germany . | |
| 2728603 | 6/1976 | Japan . | |

OTHER PUBLICATIONS

F. Neumann, *Gusseisen*, Expert Verlag, 1994, pp. 70–73, 98–99.

L. Ruschitzka, Umweltgerechte Entsorgung und Reststoffverwertung . . . Giesserei 82, (1995) Nr. 23, Nov. 27; pp. 859–869.

W. Naundorf, *Agglomeration von Rohstoffen, Prozessnebenprodukten und Entsorgungsgutern*, Verwendung von Altpapieren, Karton und Pappen als Agglomerationshifsmittel, 1994, pp. 9–24.

K. Schramm, "Formlinge Fur Kupolofen", Frank & Schulte GmbH, 1978, pp. 1–59.

W. Beitz, *Taschenbuch fur den Maschinenbau*, Springer–Verlag, 1986, p. 296.

*Meyers Grosses Taschenlexikon*, Bibliographisches Institut Mannhem/Wien/Zurich, Meyers Lexikonverlag, Book 12, p. 279, 1981.

*Primary Examiner*—Patrick Ryan
*Assistant Examiner*—M. Alexandra Elve
*Attorney, Agent, or Firm*—Bierman, Muserlian and Lucas

[57] ABSTRACT

Silicon-containing residues, as they accumulate especially during the synthesis of organosilanes out of metallic silicon, and especially methyl chloride, are processed according to the invention to briquettes, being additives for the quality adjustment of cast iron being produced in a cupola furnace in order to avoid either costly regeneration for the recovering of the valuable components or the total dumping of said silicon-containing residues. Besides the silicon-containing residue the briquettes contain 1–10 percent by weight of cardboard fiber, 5–40 percent by weight of hydraulic cement and 0–20 percent by weight of additional additives having influence on the quality of the cast iron. The cement- and cardboard fiber-containing briquettes are mechanically and thermally sufficiently stable with respect to the operation of the melting furnace. The yielding rate of the inserted small-sized silicon in the cast iron is about 85% and reaches thereby the same range of lumpy ferrosilicon.

7 Claims, No Drawings

BRIQUETTE AS AN ADDITIVE FOR METALLURGIC PURPOSES COMPRISING SILICON-CONTAINING RESIDUES, AND PROCESS FOR ITS PRODUCTION

The invention relates to silicon-containing additives for iron-metallurgical smelting processes and is mainly concerned with the formulation of silicon-containing residues to briquettes, and has its economical and environmental starting-point in relation to the problem of removal or utilization especially of such silicon-containing residuary products, as they result from the production of organosilanes by the direct reaction of silicon powder with methylchloride in the presence of a copper-catalyst.

In the production of organosilanes by the above mentioned so called "Direct Reaction", where silicon is reacted with methylchloride, preferably a so called contact mass formed from silicon powder and copper particles is reacted with an organic halogenide. The consumed contact mass accumulates as a silicon-containing residue which in addition to silicon and copper contains other elements such as aluminium and iron. When the chlorosilanes, in particular tri- and tetrachlorosilanes, are produced by reaction of grinded or crushed technical silicon or ferrosilicon with chlorine gas or gaseous hydrogen chloride, the impurities contained in the silicon-containing starting material, mainly iron and calcium, accumulate in the silicon-containing reaction residue. Silicon-containing residues are also formed by other silicon technical or silicon metallurgical processes, for example filter dusts obtained during crushing or milling of elemental silicon, whereby such small-sized and iron-containing residues mainly occur as dusts.

The mentioned silicon-containing residues, but others as well, are difficult and expensive to work up in order to recover the valuable constituents, and are therefore mostly deposited unused on special dumping grounds.

EP 0 287 934 A2, entitled "Deactivation of spent silicon powder", deals with the deposition of silicon-containing residues, resulting from the production of chlorosilanes by the direct synthesis. To solve the problem of these residues being very reactive with water and thereby reacting exothermally, it is proposed to dump the silicon-containing residue in form of pellets containing a high amount of an organic binder. A first object of the organic binder, preferably lignin, is to provide a sufficient mechanical strength to the pellets, so that they will not break while being handled and transported; another object is to coat the reactive particles in order to shield them from humidity. In order to reduce the probability of breakage, the pellets shall be smaller than 2 cm. They are produced by pressure compacting or by mixer agglomeration from a mixture of the silicon-containing residue, the binder, and preferably water. The pelletization by pressure compacting may take place in a piston or moulding press, a tableting press, a roll-type press, a pellet mill or a screw extruder, and the pelletization by mixer agglomeration may take place for example in a rotary-drum agglomerator, a paddle mixer as kneader, or a flow mixer. Finally the obtained pellets are dried at 250° C.

The present invention is based upon the economical and environmental objective, neither to have to dump silicon-containing residues of the said type, nor to work them up costly, but to bring them directly, of course formulated in an appropriate manner, to a useful technical utilization. A suitable technical field concerns the production of silicon-containing iron or steel, especially the production of cast iron in a cupola furnace using silicon-containing additives.

During the production of cast iron in the cupola furnace alloying elements are used as additives to adjust the iron quality. These alloying elements are either added to the charge of the melting furnace or to the molten cast iron after tapping. A typical such alloying element is elemental silicon. Generally ferrosilicon is used as silicon additive to the molten iron. Ferrosilicon is, however, an expensive material. Other alloying elements to be added to the furnace charge are copper, chromium and manganese, which mainly are added as scrap copper or ferrochromium or ferromanganese.

Regarding the economical and environmental objectives, the technical problem of the invention consists in providing an additive for use in the melting furnace by utilizing the said silicon-containing residues.

The prerequisite for the solution of this problem is to take account of certain parameters:

The silicon-containing residue should be submitted as compact briquettes, neither dusting nor being damaged by moisture, for which generally the pelletization techniques according to EP 0 287 934 A2 with a binder being used may be applied. On the other hand and in view of the high furnace temperatures, no binder should be used that allows the briquettes to decompose already during their insertion on top of the melting charge, as it may be readily assumed for the organic binders according to EP 0 287 934 A2. Instead of this the briquettes should reach the bottom parts of the charge without breakage and without decomposition, thereby ensuring an appropriate operation of the furnace. Accordingly briquette-shaped pressings being sufficiently stable regarding their thermal and mechanical decomposition should be advantageous.

The aforementioned will be explained as follows. The charge to be smelted is filled into the top of a cupola furnace. A determining influence on the quality of cast iron is provided by different additives, which are preferably mixed with the charge, the process being effected for example at the weighing unit for the charge. Alternatively the additives can be charged in successive layers on top of the melting charge. The hot gases, being formed during the smelting process, rise up through the cupola furnace and preheat the charge material in the upper portion of the furnace, and escape as exhaust gas. If, for example briquette-shaped pressings are used as an additive in order to adjust the quality of cast iron and said pressings partly consist of silicon-containing residues, the briquettes should not decompose before they reach the smelting zone. Otherwise the following disadvantages are to be expected. If being decomposed in an early stage, the briquettes could release the silicon as small-sized particles, so that part of the submitted silicon will be driven off together with the exhaust gas and will be lost for the melting process. It is further to be feared that another part of the released, but not driven off fine silicon material reduces the gas permeability of the charge, thereby disturbing the equal gas flow upwards through the charge, which finally leads to an uneven preheating of the charge to be molten over the whole cross-section of the furnace.

Assuming that briquettes comprising silicon-containing residues are used as an additive for the iron production, it is also conceivable to add all further substances and especially the alloying elements being necessary in order to obtain the planned quality of iron or steel by direct insertion into the briquettes during the briquetting process, so that the briquettes finally provide a single source of an additive-mixture, which makes the adding of substances of different sources unnecessary.

According to the invention the solution of the above mentioned technical task is achieved according to the characteristics of claim 1 by briquettes comprising silicon-containing residues, which, referred to the dry mass, are composed of 1–10 percent by weight of grinded cardboard, 5–40 percent by weight of hydraulic cement, 0–20 percent by weight of particles of metal or metal alloy, the remainder being silicon-containing residue.

According to the dependent claims 2 to 4, the briquettes, being additives for the iron production in cupola furnaces, preferably contain 2–5 percent by weight of the cardboard fibres, and 10–30 percent by weight of the hydraulic cement, preferably Portland-cement, though any other hydraulic cement could be used as well, for example calcium-aluminate cement.

According to the invention the briquettes may contain additional alloying elements, such as metal-particles from copper and/or alloys like ferrosilicon, ferrochromium, ferromanganese, and if required any other elements or alloys. Surprisingly the amount of cardboard fibres turned out to provide a good green strength to the briquettes, even when the cement has not yet hardened, so that the briquettes can be handled and used for their purpose immediately after moulding.

According to the invention the production of the briquettes is performed by means of mixing the components, thereby pasting with water and then moulding the resulting wet mass to briquettes by means of pressure- compacting according to one of the known techniques, briquetting by extrusion being preferred. The mixing of the components may start in dry state, followed by the addition of water, or the mixing is done immediately in the presence of water. The total water content referring to the dry mass of the mixture amounts 5 to 20 percent by weight. It has to be considered, that the employed material of silicon-containing residue regularly contains water itself. Examples for the water content of silicon-containing residues are listed in table 1 below.

Surprisingly it has been found that the amount of silicon in cast iron produced with briquettes according to the invention, shows the same good yielding rate of the provided silicon in a range of 85% as it happens to occur while using lumpy ferrosilicon instead of the briquettes. This means moreover, that there is no drift off or loss of the originally small-sized silicon-material together with the exhaust gases due to the incorporation of the silicon-containing residue into the cardboard fibres and cement containing briquettes.

EXAMPLE

Briquettes of silicon-residue, cardboard fibres, Portland-cement, ferrosilicon and water were produced in a hydraulic ram press. The pressure was 100 Mpa, compression temperature was room temperature, and the briquette mould had a diameter of 50 mm and a height of 20 mm. Before pressing, the different components were intensively mixed in a laboratory mixer (type R02 from the company Eirich, Germany).

The compression strength of the so produced briquettes was measured at room temperature immediately after production, and again after heating the briquettes up to 1,000° C. in a reducing atmosphere.

Different compositions and their compression strengths at low and high temperatures are listed in table 1.

TABLE 1

| Experiment No. | 1 | 2 | 3 | 4 | 5 | 6 | 7 |
|---|---|---|---|---|---|---|---|
| Silicon-containing residue (dry weight) in percent by weight | 77 | 57 | 72 | 69.5 | 67 | 69.5 | 69.5 |
| Original water content in the silicon-containing residue in percent by weight | 11.2 | 11.2 | 17.2 | 17.7 | 17.7 | 15 | 8.7 |
| Small-sized ferrosilicon in percent by weight | — | — | — | — | — | — | 10 |
| Binder: cardboard-fibres in percent by weight | 3 | 3 | 3 | 3 | 3 | 3 | 3 |
| Portland-cement in percent by weight | 20 | 40 | 25 | 27.5 | 30 | 27.5 | 27.5 |
| Initial compression strength in Mpa | 18.1 | 32.5 | 11.2 | 9.9 | 10.8 | 20.8 | 16.2 |
| Compression strength in Mpa after heating to 1,000° C. | 15.6 | 10.4 | 4.4 | 4.4 | 4.4 | 10.5 | 7.7 |

As can be seen in Table 1, the examined briquettes have an excellent initial compression strength and a good compression strength after having been heated to 1,000° C. On the occasion of a trial in practice, the briquettes did not decompose during their observable stay in the upper portion of the cupola furnace's charge.

Considering Table 1 there is only a single experiment mentioned, explaining the additional mixing of a further alloying component (experiment No. 7). Without limitation of the scope of the present invention, whereupon any metals or alloys might be mixed into the briquettes in order to adjust or to improve the quality of the cast iron or any other sorts of iron or steel, said experiment should be taken as an example for another advantageous outcome according to the invention, whereupon all the provided additional substances can be incorporated into the briquettes, which consequently makes the adding of substances of different sources unnecessary. However, the major advantage of the invention is due to the useful and cheap utilization of silicon-containing residues, which up to now mainly had remained unused and had to be dumped under costly preparation as waste-material.

I claim:

1. Briquette comprising silicon-containing residues as an additive for metallurgic purposes, containing, referred to dry weight: 1 - 10 percent by weight of cardboard fibre, 5-40 percent by weight of hydraulic cement, 0-20 percent by weight of particles of at least one metal and/or a metal-alloy, the reminder being silicon-containing residue.

2. A briquette according to claim 1, characterized in that the content of cardboard fibres is 2–5 percent by weight, and the content of hydraulic cement is 10–30 percent by weight.

3. Briquette according to claim 1, characterized in that the briquette contains at least copper and/or ferrosilicon and/or ferrochromium and/or ferromanganese as particles of metal and/or metal alloys.

4. A briquette according to claim 1, characterized by a cross-section diameter of about 20 mm and a height of about 50 mm.

5. Process for the production of a briquette according to one of the claim 1, characterized in that the components are mixed and either simultaneously or subsequently water is added, and that the pasted mixture is moulded to a briquette by means of pressure-compacting, preferably be extruding.

6. Process according to claim 5, characterized in that in referred to the dry weight of the components, 5 to 20 percent by weight of water are used for pasting while considering the water content of the silicon-containing residue.

7. Use of a briquette according to claim 1 as an additive for the production of cast iron in a cupola furnace.

* * * * *

UNITED STATES PATENT AND TRADEMARK OFFICE
CERTIFICATE OF CORRECTION

PATENT NO. : 5,993,508
DATED : November 30, 1999
INVENTOR(S) : Lutz Stephan

It is certified that error appears in the above-identified patent and that said Letters Patent is hereby corrected as shown below:

Column 4, claim 1,
Delete claim 1 and substitute therefor the following:
--1. A briquette for use as an additive for a furnace in a metallurgical process, said briquette consisting essentially of:
about 1 to about 10 percent by weight cardboard fiber;
about 5 to about 40 percent by weight hydraulic cement;
about 0 to about 20 percent by weight of particles of at least one metal or metal alloy; and
the remainder being a silicon-containing residue from the Direct Reaction.

Column 5,
Line 9, delete "one of the".

Signed and Sealed this

Fourteenth Day of August, 2001

*Attest:*

NICHOLAS P. GODICI
*Attesting Officer*  Acting Director of the United States Patent and Trademark Office

UNITED STATES PATENT AND TRADEMARK OFFICE
CERTIFICATE OF CORRECTION

PATENT NO.    : 5,993,508  
DATED         : November 30, 1999  
INVENTOR(S)   : Lutz Stephen Page 1 of 1

It is certified that error appears in the above-identified patent and that said Letters Patent is hereby corrected as shown below:

Column 5, claim 3,
Delete claim 3, and substitute therefor the following:

--3. A briquette according to claim 1 wherein the briquette contains particles of at least one metal or metal alloy and said particles are selected from the group consisting of copper, ferrosilicon, ferrochromium and ferromanganese.

Column 5,
Line 9, delete "one of the".

Signed and Sealed this

Twentieth Day of November, 2001

Attest:

*Nicholas P. Godici*

NICHOLAS P. GODICI  
*Attesting Officer*   *Acting Director of the United States Patent and Trademark Office*